US005489181A

United States Patent [19]
Greaves

[11] Patent Number: 5,489,181
[45] Date of Patent: Feb. 6, 1996

[54] TRANSPORT APPARATUS AND METHOD OF USING SAME

[76] Inventor: Warren A. Greaves, P.O. Box 241, Escondido, Calif. 92033

[21] Appl. No.: 260,698

[22] Filed: Jun. 16, 1994

[51] Int. Cl.$^6$ ................................................ B65G 67/02
[52] U.S. Cl. .................... 414/398; 414/595; 414/632; 414/786; 414/921
[58] Field of Search .................................. 414/347, 350, 414/351, 398, 399, 422, 471, 525.1, 595, 605, 630–632, 634, 786, 921; 244/137.1

[56] References Cited

U.S. PATENT DOCUMENTS

| | | | |
|---|---|---|---|
| 2,619,196 | 11/1952 | Scott | 414/595 X |
| 3,524,558 | 8/1970 | Mastracci et al. | 414/398 X |
| 3,885,685 | 5/1975 | Montgomery et al. | 244/137.1 X |
| 4,051,970 | 10/1977 | Ramsey | 414/630 |
| 4,249,848 | 2/1981 | Griffin et al. | 414/595 X |
| 4,356,891 | 11/1982 | Bartow | 414/631 X |
| 4,531,615 | 7/1985 | Wible | 414/631 X |
| 4,669,943 | 6/1987 | Zamotin | 414/399 X |
| 4,782,938 | 11/1988 | Cooper et al. | 414/347 X |
| 4,813,839 | 3/1989 | Compton | 414/398 X |

FOREIGN PATENT DOCUMENTS 1244985  9/1960  France ................................. 414/525.1

Primary Examiner—Frank E. Werner
Assistant Examiner—James W. Keenan
Attorney, Agent, or Firm—Bernard L. Kleinke; Jerry R. Potts; Peter P. Scott

[57] ABSTRACT

A new and improved transport apparatus which can be used to transport a load between different level surfaces according to a novel method of use of the present invention. The transport apparatus includes an undercarriage including a front and rear trucks having an elongated upright track assembly mounted therebetween for defining a predetermined path of travel that a load will follow as it is moved between a ground level position and an upper load destination position substantially above the ground. A load carriage unit mounted movably to the upright track assembly is coupled to a motor adapted to move the load reciprocatively rectilinearly along the predetermined path of travel. The front and rear truck construction facilitates transportation over a variety of terrain. Substantially, the trucks and upright track assembly are coupled together in a set of triangular arrangements that form a rigid, stable, load moving construction.

36 Claims, 5 Drawing Sheets

5,489,181

TRANSPORT APPARATUS AND METHOD OF USING SAME

TECHNICAL FIELD

The present invention relates in general to transport apparatus and methods of using such apparatus. More particularly, the invention relates to a transport apparatus for moving a person or load between two positions, such as between a ground level position and an upper level position to facilitate loading and unloading an aircraft vehicle.

BACKGROUND ART

There have been many types and kinds of loading or transport devices used to facilitate moving a load between upper and lower positions. For example, elevators and fork lifts accomplish such transportation purposes.

While such devices and apparatus have been satisfactory for some applications, such devices have not been entirely satisfactory for transporting a load safely over an obstruction into a desired elevated load receiving area. For example, transporting a passenger over the flotation device of a helicopter into a passenger receiving area.

Presently, a handicapped or elderly person must be lifted manually into the passenger area of a helicopter, while the rotary wings are in motion. Such an operation is awkward, and uncomfortable for the passenger.

Therefore, it would be highly desirable to have a new and improved transport apparatus which enables access over an obstruction into a desired elevated load receiving area in a safe and comfortable manner.

DISCLOSURE OF INVENTION

Therefore, the principal object of the present invention is to provide a new and improved transport apparatus and method of using it, wherein the apparatus is readily and conveniently used to transport loads, such as passengers and cargo, over obstructions between different levels.

Another object of the present invention is to provide such a new and improved transport apparatus and method of using it on a variety of different aircraft, wherein the apparatus is sturdy, stable and sufficiently safe to transport passengers, such as disabled and elderly persons, between different levels in a comfortable and secure manner.

Briefly, the above and further objects of the present invention are realized by providing a new and improved transport apparatus which can be used to transport a load between different levels according to a novel method of use of the present invention.

The transport apparatus includes an undercarriage including front and rear trucks having an elongated upright track assembly mounted therebetween for defining a predetermined path of travel that a load will follow as it is moved between a ground level position and an upper load destination position substantially above the ground. A load carriage unit mounted movably to the upright track assembly is coupled to a motor adapted to move the load reciprocatively rectilinearly along the predetermined path of travel.

The front and rear truck construction facilitates transportation over a variety of terrain. Substantially, the trucks and upright track assembly are coupled together in a set of triangular arrangements that form a rigid, stable, load moving construction.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
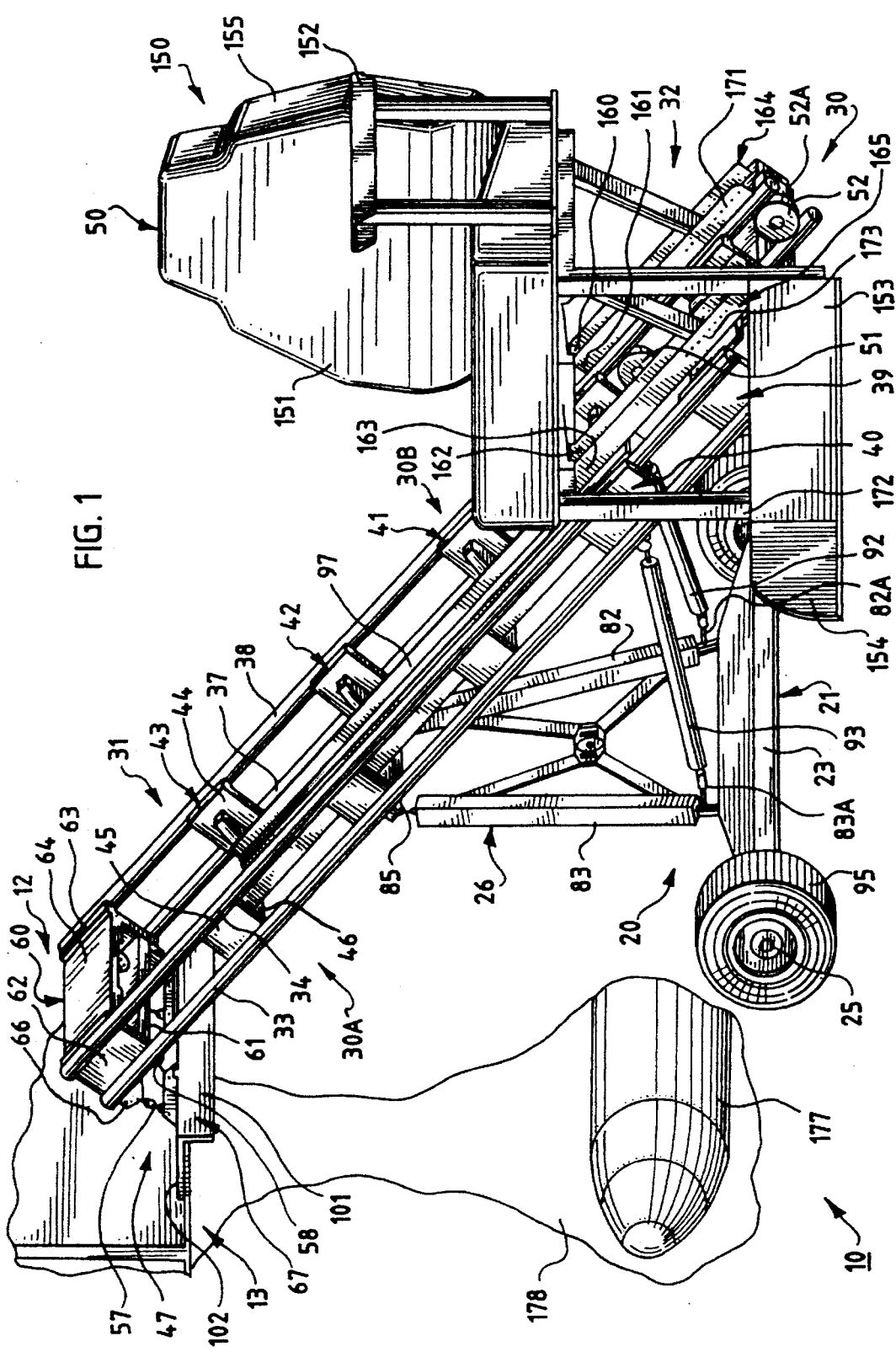
FIG. 1 is a left-side perspective view of a transport apparatus which is constructed in accordance with the present invention.

Referring now to the drawings and more particularly to FIGS. 1–4 thereof, there is shown a vehicle access or transport apparatus 10 which is constructed in accordance with the present invention. The access apparatus 10, transports a load (not shown), such as a physically disabled or infirm person, a package, or the like between an entranceway 12 to a vehicle 13 and the ground 14.

While in the preferred embodiment of the present invention, the apparatus 10 is illustrated for transporting the load into a vehicle, it will be understood by those skilled in the art that the apparatus 10 may be employed in any environment where a load must be transported between a lower level position and an upper level position over a protruding obstruction.

Figure 2:
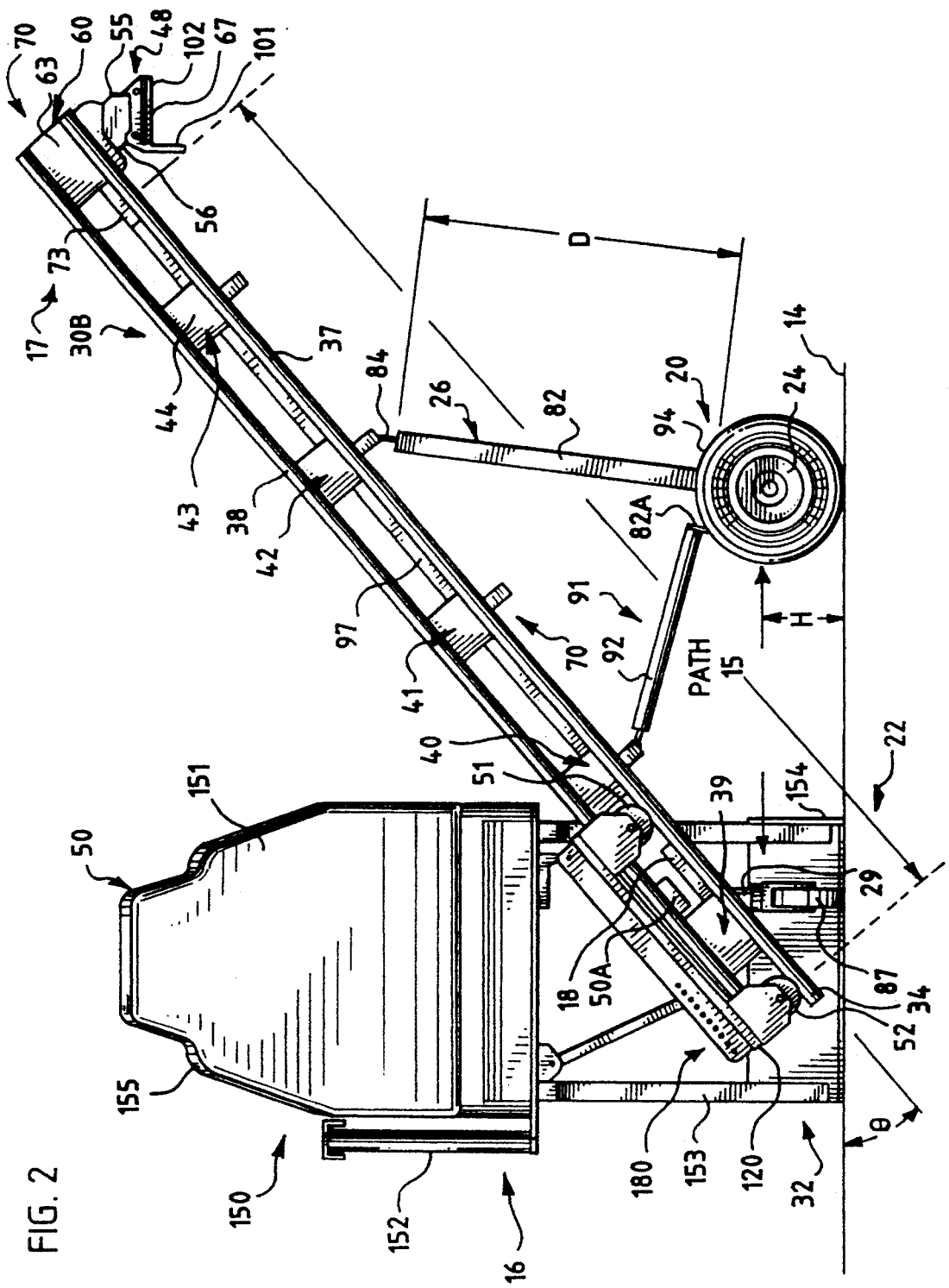
FIG. 2 is a partially cut away left-side perspective view of the transport apparatus of FIG. 1.

The access apparatus 10 generally comprises an undercarriage or truck 20 having an elongated upright track assembly 30 mounted thereon for guiding a load carriage unit 50 along a predetermined path of travel 15 (FIG. 2). In this regard, the track assembly 30 includes a pair of tracks, an upright left side track indicated generally at 30A and an upright right side track indicated generally at 30B that defines the path of travel 15 that the carriage unit 50 will follow as it is moved between a ground level position 16 slightly above the ground to an upper level or load destination position 17 substantially above the ground.

Each of the tracks 30A, 30B include a pair of lower and upper rails 33, 34 and 37, 38 respectively for capturing pairs of wheels disposed on the underside of the carriage unit 50, such as a pair of right side wheels 51, 52 and a pair of left side wheels indicated generally at 53. The pairs of wheels are mounted to an undercarriage 120 forming part of the carriage unit 50.

To facilitate carrying a passenger attempting to gain access to the vehicle 13, the carriage unit 50 also includes a load support unit indicated generally at 150 having a seat 151, a left hand arm rest 152, a foot rest 153, and a right side foot guard 154 that cooperate to give a passenger a sense of security as he or she is being transported on the apparatus 10.

Although in the preferred embodiment of the present invention, the load support unit 150 is adapted for transporting a passenger, those skilled in the art will understand that other types and kinds of loads, such as a cargo load can be transported by the carriage unit 50.

A T-shape elongated bar member 50A attached to the undercarriage 120 by means not shown is coupled to a motor 18 which is adapted to move the load reciprocatively rectilinearly along the predetermined path of travel 15 defined by the track assembly 30.

Figure 3:
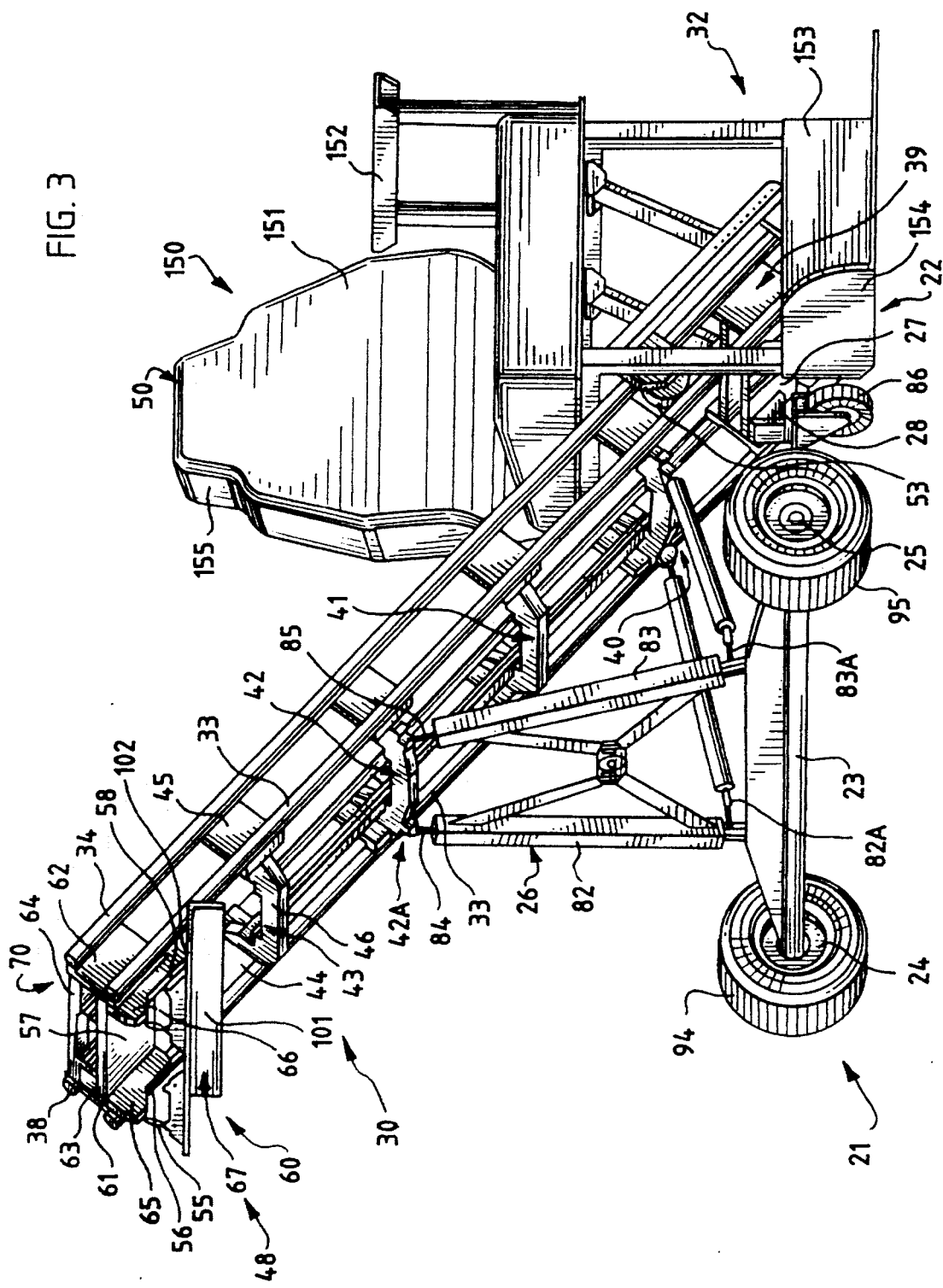
FIG. 3 is a right-side perspective view of the transport apparatus of FIG. 1.

A pulley apparatus indicated generally at 70 (FIG. 4) is mounted on the track assembly 30 and cooperates with a motor driven reciprocative telescoping device 80 to establish a mechanical advantage that greatly facilitates in the transportation of the load from the ground position 16 to the upper destination position 17. For clarity purposes, only portions of the pulley arrangement 70 are illustrated in FIGS. 1–3.

The pulley apparatus 70 generally includes a pair of movable pulleys or tackles 72 and 72A which is coupled to the telescoping device 80 by a coupler 75 and a pair of fixed pulleys or blocks 71 and 71A mounted to an engagement assembly indicated generally at 60 which is disposed at the front portion 31 of the track assembly 30. A line or cable 73 fixed at its upper end to the engagement assembly 60 and its lower end to the T-bar 50A forming part of the carriage unit 50, extends between the fixed and moveable pulleys 71, 71A, 72 and 72A respectively for helping to move the load as the telescoping device 80 is driven by the motor 18.

The telescoping device 80 is mounted at an opposite end of the track assembly 30 so that it is spaced apart from the fixed pulleys 71 and 71A by a sufficient distance to permit the mechanical advantage to be established as a piston 81 within the device 80 travels reciprocatively rectilinearly over its given path of travel 19.

The given path of travel 19 followed by the piston 81 is substantially less than the length of the predetermined path of travel 15 followed by the carriage unit 50 as it is moved between the ground level 16 and the upper level 17. In this regard, for each unit of distance traveled by the piston 81 along path 19, the carriage unit 50 will travel three times that unit of distance along path 15. From the foregoing, those skilled in the art will understand that the mechanical advantage provided by the pulley assembly 70 is about a 3:1 advantage. This 3:1 advantage is important as the distance of the given path of travel is a substantially short path of about one foot, while the carriage path of travel is about three feet. Thus, a relatively inexpensive telescoping device 80 may be employed.

Although in the preferred embodiment of the present invention, the telescoping device 80 is described as having a given path of travel of about one foot, those skilled in the art will understand that other types and kinds of reciprocative devices may be employed which may have greater or lesser given paths of travel. Thus, both other types and kinds of pulley arrangements as well as other types and kinds of reciprocative devices are anticipated within the scope of the present invention.

The apparatus 10 also includes a control circuit 300 for helping to energize the motor 18 to cause the carriage unit 50 to be moved up and down the track assembly 30. The circuit 300 will be described hereinafter in greater detail.

In use, the apparatus 10 is positioned by an operator (not shown) in a position adjacent to the vehicle 13 so that the upper end of the track assembly 30 is disposed at the vehicle entranceway 12 as illustrated in FIG. 1. The load is then placed on the carriage unit 50 at either the ground level 16 or at upper level 17 depending upon the direction of the load is to be transported. Once the load has been received on the carriage unit 50, the operator connects the motor 18 to a source of direct current, such as a 24 VDC source provided by the vehicle 13 and then activates the motor 18 to cause the carriage 50 to move between the ground level 16 and the upper level 17.

In this manner, the load is transported over any obstacle extending outwardly from the vehicle 13, such as a floatation device 177 extending from a body portion 178 of the vehicle 13, to the entranceway 12 where access to the vehicle can be achieved easily.

Considering now the construction of the transport apparatus 10 in greater detail with reference to FIGS. 1–4, the undercarriage or truck 20 generally includes a front truck 21 and a rear truck 22 to rollably support the track assembly 30 above the ground 14.

The front truck 21 includes an elongated axle unit 23 having widely spaced apart rims 24 and 25 with respectively pneumatic tires or wheels 94, 95 mounted thereon. The large, widely spaced apart front tires 94, 95, in cooperation with the rear truck 22, helps the overall construction of the apparatus 10 to be very sturdy for load transportation purposes.

A frame 26 having a generally triangular construction is mounted between the axle 23 and a front portion 31 of the track assembly 30. The frame 26 extends upwardly from the axle 23 at a given angle for a desired predetermined distance D (FIG. 2) and is removably secured to the underside of the track assembly 30.

As best seen in FIG. 2, the frame 26 inclines the track assembly 30 upwardly at about an angle θ and includes a pair of side members 82 and 83 which include extendable arm portions 84 and 85 respectively. In this regard, to accommodate vehicles and destination loading levels of different heights, the arms 84 and 85 may be extended or retracted and locked (by means not shown) to the desired predetermined distance D. Thus, in use, the distance D and the angle θ may be adjusted by the operator to accommodate for different uses of the apparatus 10.

A secondary frame indicated generally at 91 forms an imaginary generally triangular support base between the frame 26 and a rear portion 32 of the track assembly 30. This triangular configuration helps the overall constructed of the apparatus 10 to be very sturdy for load transportation purposes.

The secondary frame 91 has a generally triangular shape and includes a right strut member 92 and a left strut member 93. The right member 92 extends from a base portion 82A of the side member 82 to the right side of a bottom cross member 40 forming part of the track assembly 30. The right strut member 92 is mounted for lateral pivotal movement relative to the side member 82 and up and down pivotal movement relative to the cross member 40.

As best seen in FIG. 1, the left strut member 93 extends from a base portion 83A of the side member 83 to the left side of the bottom cross member 40. The strut member 93 is mounted for corresponding pivotal movement relative to members 40 and 83.

In this manner, the front and rear trucks 21 and 22 may be moved in unison to transport the track assembly 30 and carriage unit 50 over various terrains which may not be flat. The lateral and pivotal movement effect between the struts 92 and 93 with relationship to the cross member 40 and the side members 82 and 83 respectively, is sufficient to accommodate a large variety of terrains. Also, the triangular construction of frames 26 and 91 in cooperation with the track assembly 30 form a set of triangular arrangements that make the construction of the apparatus 10 very sturdy to help prevent load or apparatus toppling.

Considering now the rear truck 22 in greater detail with reference to FIGS. 2 and 3, the rear truck 22 is mounted to the rear portion 32 of the track assembly 30 to rollably support the rear portion 32 above the ground at the ground level 16. The rear truck 32 generally includes a base plate 27 (FIG. 3) which is mounted between a pair of spaced apart left and right side rails 33, 34 forming part of the track assembly 30. In this regard, the base plate 27 helps secure the respectively left and right side rails 33 and 34 together rigidly.

A pair of caster block 28 and 29 are secured to the underside of the base plate 27 on its respectively left and right sides. Each of the caster blocks 28, 29 have angled surfaces that permit them to be mounted flush against the base plate 27 with their lower or under surfaces being disposed in a plane that is substantially parallel with the ground.

The caster blocks 28 and 29 each include centrally disposed holes or apertures which are adapted to receive and capture therein a pair of small casters 86 and 87 respectively. The diameter of each of casters 86 and 87 is substantially smaller than the diameter of the wheels 94 and 95 respectively to compensate for the gap created by the wheels 94 and 95 with respect to their rims 24, 25 respectively. In this regard, the height H of each caster with respect to its mounting block surface is about equal to the distance from the ground to the center of each corresponding rim 24, 25.

Considering now the track assembly 30 in greater detail with reference to FIGS. 1–3, the right side rail members 37 and 38 are generally circular in cross section to capture the wheels 51, 52 therebetween and to limit their movement along their longitudinal dimensions. The left side lower and upper rail members 33 and 34 are substantially similar to rail members 37 and 38.

The lower left and right rail members 33, 37 respectively are equally spaced apart laterally from one another along their entire length for receiving the pulley assembly 70 therebetween. The rail members 33, 34 and 37, 38 are also equally spaced apart vertically along their entire length for capturing the left and right wheels therebetween.

A set of substantially similar U-shaped cross bar members 39–43 cooperate together for helping to secure the rail members 33, 34 and 37, 38 rigidly together.

As each of the cross bar members 39, 41, 43 are substantially identical only cross bar member 43 will be described hereinafter in greater detail. Referring now to FIGS. 1 and 3, cross bar member 43 has a modular construction and includes a pair of block members 44, 45 disposed on diametrically opposite ends of a centrally disposed brace member 46. The brace member 43 is generally U-shaped and is bolted at its ends to the block members 44 and 45 respectively. The block members 44 and 45 are in turn, bolted respectively to the lower and upper left rail members 33, 34 and the lower and upper right rail members 37, 38. As best seen in FIG. 2, the cross bar members 39–43 are equally spaced apart along the longitudinal dimension of the track assembly 30. In this regard, as will be explained in greater detail hereinafter, the top surface of each brace member of the respective cross bar members 39–43 lie in the same plane to form a mounting surface for a movable pulley guide track 96 (FIG. 3). For the purpose of mounting the track 96 to each brace member, threaded mounting holes (not shown) are provided therein to enable the track 96 to be mounted to each brace member, such as the brace member 46.

The cross bar members 40 and 42 are substantially identical to cross bar members 41 and 43, except their brace members include cut out portions, such as a cut out portion 42A. In this regard, the cross bar members 40 and 42 are adapted to receive the frames 91 and 26 respectively in their cut-out portions for securing purposes by means not shown.

Figure 4:
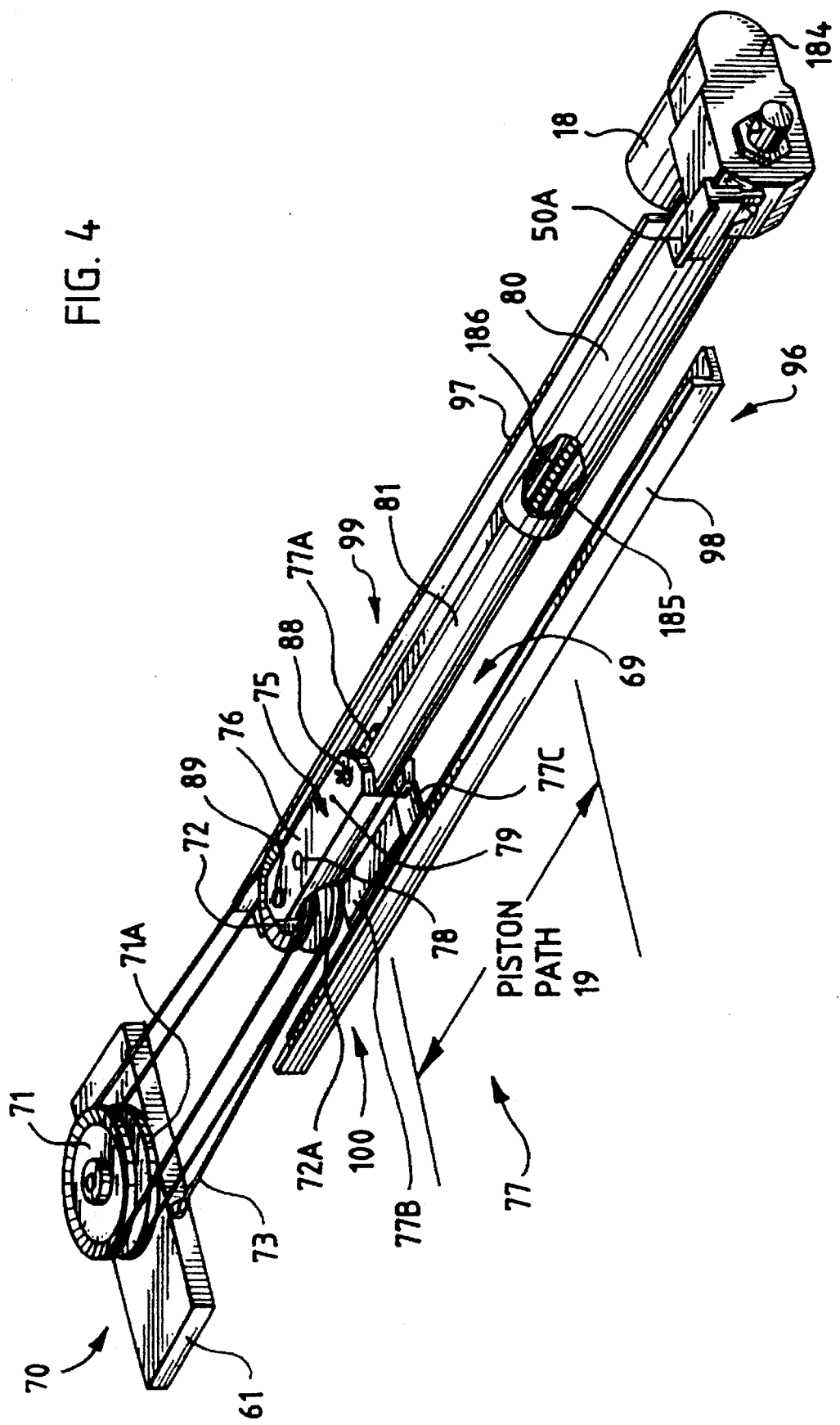
FIG. 4 is a perspective view of a pulley arrangement of the transport apparatus of FIG. 1.

Considering now the movable pulley guide track 96 in greater detail with reference to FIGS. 2 and 4, the track 96 generally includes an elongated L-shaped right track member or rail 97 and an elongated L-shaped left track member or rail 98. The track 96 helps define a given path of travel that will be followed by the moveable pulley 72 as it is moved reciprocatively linearly by the telescoping device 80.

Considering now the coupler 75 in greater detail with reference to FIG. 4, the coupler generally includes an elongated mounting bar 76 having a piston receiving cutout indicated generally at 99 on one end thereof and a pulley receiving cutout indicated generally at 100 on an opposite end thereof. In this regard, the piston 81 is received in the cutout 99 and attached or coupled to the lower end of the mounting bar 76 by a clevis pin 88 or similar securing device. The moveable pulleys 72 and 72A are received within cutout 100 for friction free rotatable movement and is attached together on a common shaft (not shown) by a nut and bolt arrangement indicated generally at 89.

A T-shape guide member or slider indicated generally at 77 is disposed on the underside of the bar 76 and is mounted thereto by another pair of bolt/nut arrangements 78 and 79 respectively. The T-shaped guide member 77 includes a pair of grooved ears 77A and 77B which are adapted to be received in a rail portion of the right and left track members 97, 98 respectively. A lower body portion 77C which is disposed in a space 69 between the track members 97 and 98 respectively. In this regard, the body portion 77C cooperates with the ears 77A and 77B to help position and retain the coupler 75 between the rails 97 and 98 of the movable pulley track 96 as the pulleys 72 and 72A move reciprocatively rectilinearly in response to the movement of piston 81.

Considering now the wheels 51, 52 and 53 in greater detail, as each wheel is substantially identical, only wheel 52 will be described in greater detail. Referring now to FIG. 1, wheel 52 is substantially circular having a groove 52A around its entire outside periphery. The groove 52A is adapted to receive therein portions of the rails 37, 38.

From the foregoing, those skilled in the art will understand the four wheels of the carriage unit 50 are captured rollably between the upper and lower rails of the track assembly 30, such as wheels 51, 52 are captured between lower and upper rails 37 and 38 to allow for weight transfer for stability. In this regard, for example, when a passenger shifts his or her weight while being supported on the seat, the person's weight is transferred smoothly and continuously between the upper and lower pairs of rails. As indicated in FIG. 2, when the seat is unoccupied, all four wheels, such as wheels 51 and 52 are rollably supported by the lower rails, such as the rail 37. However, when a person is being transported on the seat and a weight shift occurs, any one or more of the wheels is free to move upwardly into engagement with its corresponding upper rail, such as the rail 38, and start rotating in an opposite direction. Therefore, a passenger shifting his or her weight, will do so comfortably without experiencing any undesirable shifting of the seat, and thus the seat is perceived to be stable at all times.

Considering now the load support unit 150 in greater detail, the seat 151 is mounted in a pair of tracks mounted to the top surface of the undercarriage 120 and is adjustable positionally relative to the track assembly 30 so that when the angular position of the track is changed adjustably for different sized vehicles. For example, the angular position of the seat 151 can also be adjusted to maintain cargo in a plane substantially parallel with the ground.

The seat includes a pair of right and left front leg members 160 and 162 mounted at their upper ends to the underside of the seat 151 and at their lower ends pivotally by pivot pins, such as a pin 161 and 163 in tracks 164 and 165 respectively. The seat also includes a pair of right and left rear leg members 170 and 172 mounted at their upper ends to the underside of the seat and at their lower ends pivotally by pivot pins, such as a pin 171 and 173 in tracks 164 and 165 respectively. In this regard, the seat is mounted pivotally for adjusting the plane of the top surface of the seat 151 relative to the angle of the track assembly 30. A series of holes indicated generally at 180 cooperate with the pivot pins 171, 173 to enable the seat position to be secured adjustably at different positions.

As best seen in FIGS. 1–3, the seat 151 also includes a back rest 155 for further helping the passenger have a feeling of comfort and security as he or she is transported on the apparatus 10.

Considering now the engagement assembly 60 in greater detail with reference to FIGS. 1–4, the engagement assembly 60 is disposed at an end portion of the track assembly 30 for helping to support the front portion 31 of the apparatus 10 against the vehicle 13.

The engagement assembly 60 generally includes a base plate 61 which extends between a pair of support members 62 and 63 for helping to secure the bottom rail members 33 and 37 together. A top plate 64 is disposed above and spaced apart from the base plate 61 also extends between the support members 62 and 63 for helping to secure the rail members 34 and 38 together. In this regard, the support members 62 and 63 are secured (by means not shown) to rails 33, 34 and 37, respectively.

The base plate 61 and top plate 64 form a pulley receiving space which is dimensioned for receiving therein the fixed pulleys 71 and 71A. In this regard, the pulleys 71 and 71A are mounted in the pulley receiving space by a mounting bolt nut arrangement (not shown) and is partially protected therein.

A pair of support blocks 65 and 66 are mounted to the underside of the base plate 61 and depend therefrom for receiving and supporting a surface or floor engagement plate 67. In this regard, the plate 67 is mounted pivotally to the blocks 65 and 66 by a set of pivot pins, such as the pins 55–58.

A pair of spaced apart mounting fixtures indicated generally at 47 and 48 are mounted to the engagement plate 67 for helping to pivotally mount the plate 67 to the blocks 65 and 66. In this regard, a set of quick release pins (not shown) secure the pivot pins 55–58 between the blocks 65, 66 and the mounting fixtures 47 and 48 respectively so that the plate 67 can be quickly and easily removed from the engagement assembly 60.

Considering now the engagement plate 67 in greater detail, the engagement plate 67 is generally L-shaped having a lip engagement portion 101 and a floor engagement portion 102. The lip portion 101 depends downwardly from the base portion 102 and functions as a stop to help position the apparatus 10 in the entranceway 12 of the vehicle 13 and has rubber padding (not shown) to protect the aircraft.

Figure 5:
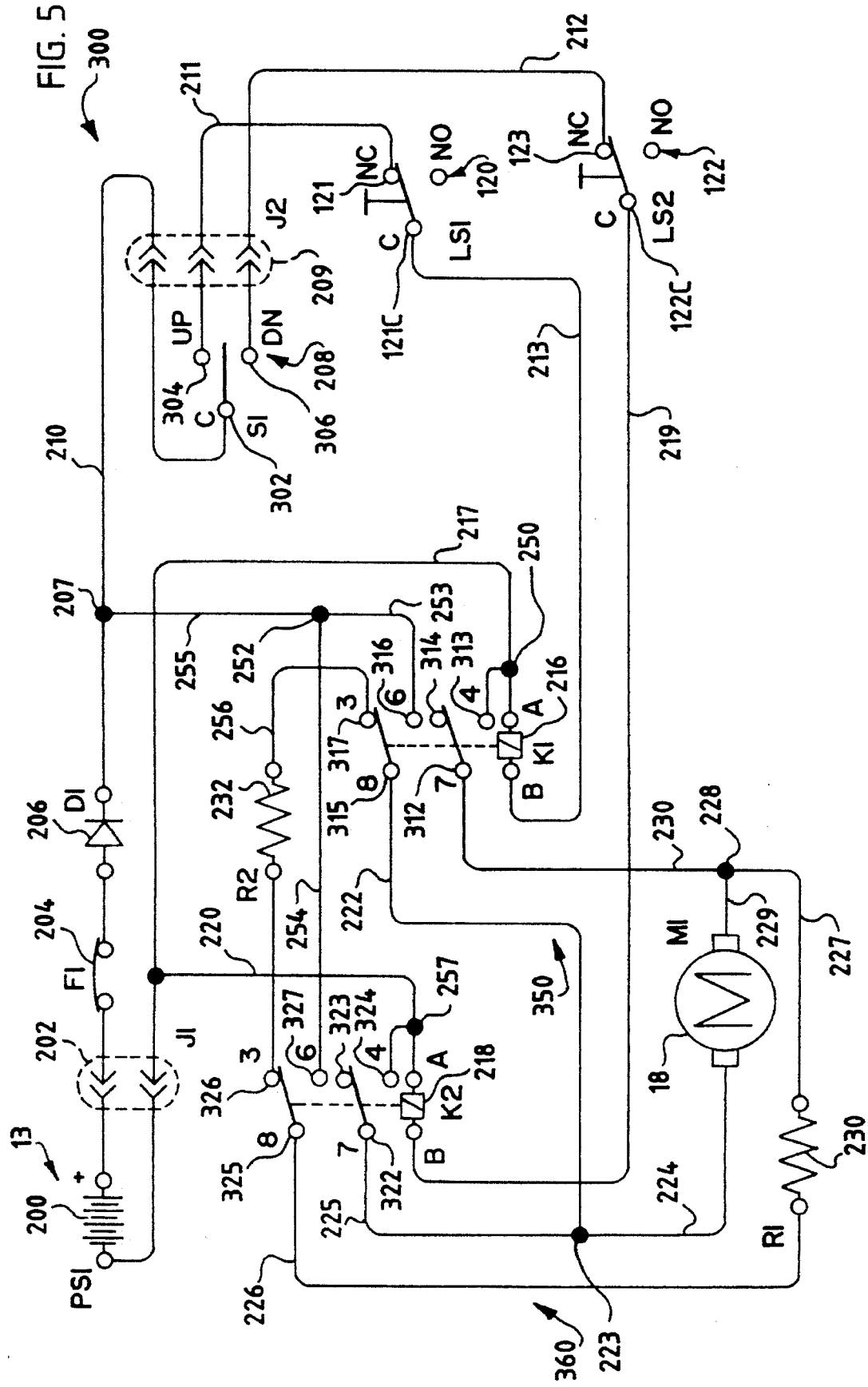
FIG. 5 is a schematic diagram of a control circuit of the transport apparatus of FIG. 1.

Considering now the track assembly 30 in still greater detail, as best seen in FIG. 5, a pair of limit switches, an upper limit switch 120 and a lower limit switch 122 are mounted at the front portion 31 and the rear portion 32 of the track assembly. The limit switches are disposed in the carriage path 15 and are activated whenever the carriage unit 50 reaches predetermined upper and lower positions on the track assembly 30. For clarity purposes, the limit switches 120 and 122 and their associate wiring are not illustrated in FIGS. 1–3.

To further prevent the carriage 50 from leaving the track assembly 30, the cross bar member 39 and plate 61 function as mechanical stops. In this regard, the T-bar 50A of the carriage unit 50 will engage plate 61 at the upper position, and will engage the cross bar member 39 at the lower position.

Considering now the control circuit 300 in greater detail with reference to FIG. 5, the control circuit 300 generally includes the motor 18, the limit switch 120 and 122, and a control switch 208 for activating the motor 18 in either a forward or reverse direction. A pair of control relays, an up control relay 216 and a down control relay 218 operate a set of mechanical contacts that will be described hereinafter in greater detail. The circuit 300 also includes a pair of current limiting resistors 230 and 232.

Considering now the motor 18 and limit switches 120 and 122 in greater detail with reference to FIG. 5, the motor 18 is energized by a power source 200 such as the direct current power from the vehicle 13. A connector 202 enables the motor 18 to be coupled to the power source 200.

In order to protect the motor 18 and limit switch 120, 122 from short circuit damage, the motor 18 and switch 120, 122 are coupled electrically together via a circuit breaker 204. A diode 206 having its anode connected to the positive side of the power source 200 via the connector 202 and the circuit breaker 204 prevents the apparatus 10 from operating in reverse. The diode 206 is a 10 amp 28 volt conventional semiconductor device.

Considering now the control switch 208 in greater detail, the control switch 208 is a single pole, double throw, three position switch connected to track assembly 30 via a connector 209. The switch 208 has a common pole contact 302, an up contact 304 and a down contact 306. The common contact 302 is connected to the anode of diode 206 via a common node 207. The up contact 304 is connected to a normally closed contact 121 of the upper limit switch 120 via a conductor 211. In this regard, when the upper limit switch 120 is activated mechanically to its normally open position, the power coupled to the motor 18 via the normally closed contact 121 and an associate common contact 121C will be terminated immediately.

The down contact 306 is connected to a normally closed contact 123 of the lower limit switch 122 via a conductor 212. In this regard, when the lower limit switch 122 is activated mechanically to its normally open position, the power coupled to the motor 18 via the normally closed contact 123 and an associated common contact 122C will also be terminated immediately.

Considering now the upper limit switch 120 in greater detail, the common contact 121C is connected to one connector of the up control relay 216 via a conductor 213. The other connector of the up control relay 216 is connected to the negative side of the power source 200 via a conductor 217 and the connector 202. In this regard, when power is applied to the control relay 216 it will cause a set of mechanical contacts indicated generally at 350 to be engaged from their normally opened position to their closed positions.

Considering now the lower limit switch 122 in greater detail, the common contact 122C is connected to one connector of the down control relay 218 via a conductor 219. The other connector of the down control relay 218 is connected to the negative side of the power source 200 via a conductor 220 and the connector 202. In this regard, when power is applied to the control relay 218 it will cause another set of mechanical contacts indicated generally at 360 to be engaged from their normally opened positions to their closed positions.

Considering now the upper control relay 216 in greater detail, the set 350 of mechanical contacts includes contacts 312–317. Contact 312 is connected via a pair of conductors 229, 230 and a common node 228 to one side of the motor 18. Common node 228 is also connected to one side of the resistor 230 via a conductor 227. The other side of the resistor 230 is connected to control relay 218 via a conductor 226. In this regard, the control relay 18 enables positive to negative power to be applied to the motor 18 when it is not activated and relay 216 is active. Conversely, when relay 216 is not activated and relay 218 is activated negative to positive power will be applied to the motor 18 to cause it to be operated in the opposite direction.

Contact 316 is a normally open contact connected to a common node 252 via a conductor 253. Common node 252 is connected to common node 207 via a conductor 255, and to a normally open contact 327 of relay 318 via a conductor 254.

Contact 314 is an always open contact, while contactor 313 is connected to the conductor 217 via a common node 250. Contact 317 is connected to one side of the resistor 232 via a conductor 256, while the other side of resistor 232 is connected to a normally closed contact 326 of relay 218.

Considering now the lower control relay 218 in greater detail, the set 360 of mechanical contacts includes contacts 322–327. Contact 322 is connected via a common node 223 and a pair of conductors 224 and 225 to the motor 18. The common node 223 is also connected to contact 315 of relay 216 via a conductor 222.

Contact 323 is open, while contact 324 is connected to conductor 220 via a common node 257. Contact 327 is connected to the common node 252 via the conductor 254.

Considering now the operation of the circuit 300 in greater detail with reference to FIG. 5, whenever the user activates the control switch 208 to cause the carriage unit 50 to move from the ground level 16 to the upper level 17, a current path will be established between contacts 302 and 304 to enable power to be applied to relay 216 so long as the upper limit switch 120 is not activated.

When power is applied to relay 216 the normally closed contacts 315 and 317 will be switched to establish a current path between contacts 315 and 316 to apply positive power to the motor 18 via conductor 224. When relay 216 is energized the normally open contacts 312, 314 are switched to establish a current path to the negative side of power source 200 which is also coupled to the motor 18 via conductor 229. Motor 18 will therefore be powered in a forward direction until limit switch 120 is activated.

Conversely when switch 208 is activated in a down mode to cause the carriage unit 50 to move from the upper level 17 to the lower level 16, a current path will be established between contacts 302 and 306 which, in turn, removes power from contact 304.

Current will therefore flow to relay 218 causing normally closed contacts 325, 326 to be opened and normally open contacts 325, 327 to be closed. This, in turn, causes positive power to be applied to conductor 229 to energize the motor 18 with negative power. When relay 218 is energized, normally open contacts 322, 324 are closed which completes the current path from the motor 18 via conductor 224 to the negative side of the power source 200.

Considering now the pulley apparatus 70 in still greater detail, the pulleys 71 and 71A are generally circular in construction each having a groove extending around its entire periphery. The grooves in each pulley are dimensioned for receiving a portion of the line 73 therewithin.

Pulleys 72 and 72A are similar to pulleys 71 and 71A. In this regard, each pulley 72, 72A includes a groove extending around its entire periphery. The grooves in pulleys 72, 72A are also dimensioned for receiving therein a portion of the line 73.

As best seen in FIG. 4, the line 73 is fixed at one of its ends to plate 61 and extends therefrom into the groove of pulley 72A around the periphery of pulley 72A, thence into the lower pulley 71A groove, thence to the upper pulley 72 groove, thence into the upper pulley 71 groove and thence to the T bar 50A where the other end of the line 73 is secured thereto.

Considering now the motor 18 in greater detail with reference to FIGS. 2 and 4, the motor 18 is mounted by means not shown to the cross bar member 39. A gear transmission box 184 is connected to the motor 18 via a drive gear (not shown) for driving a worm 185 in the telescoping device 80. A ball nut 186 in device 80 cooperates with the worm 185 to cause the piston 81 to move rectilinearly reciprocatively along the piston path of travel 19.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A transport apparatus, comprising:

front truck means having an elongated axle with a pair of widely spaced apart front tires disposed on opposite ends thereof for helping the apparatus to be dynamically and statically stable for load transportation purposes;

each one of said tires having a given diameter for supporting said axle at about a height H above the ground;

rear truck means having caster mounting means with a pair of closely spaced apart casters mounted thereon for further helping the apparatus to be dynamically and statically stable for load transportation purposes;

an elongated track assembly mounted at about one of its ends on said rear truck means for defining a predetermined path of travel between the ground and an upper load destination position;

triangular frame means mounted between said axle and at about the other one of the ends of said track assembly for supporting from below said track assembly, and for causing a front portion of said track assembly to be inclined upwardly at an angle of inclination relative to the ground;

said frame means including extendable arm means for raising and lowering said track assembly and for adjusting said angle of inclination to accommodate destination loading levels of different heights;

each of said casters having another given diameter substantially equal to said height H to raise a rear portion of said track assembly a sufficient distance above the ground to compensate for the axle being disposed at about said height H above the ground to facilitate dynamic and static stability of the apparatus;

load carriage means mounted rollably on said track assembly for supporting a load to be transported between a ground level position and the upper load destination position to move the load reciprocatively rectilinearly along said path of travel defined by said track assembly;

a pulley apparatus mounted at one end of said track assembly for helping cause said load carriage means to move along said path of travel to raise or lower the load;

said pulley apparatus including block means fixedly mounted to said track assembly, a line fixed at one of its ends to said track assembly and extending over said block means with its opposite end fixed to said load carriage means, and tackle means connected to said line for providing a mechanical advantage to help facilitate moving the load;

telescoping means mounted at an opposite end of said track assembly and to said tackle means for causing said telescoping means to be moved toward and away from said opposite end through a given distance substantially less than the length of said path of travel and for causing said carriage means to be moved between the ground level position and the upper load destination position along the entire length of said path of travel; and motive means mounted at said opposite end of said track assembly for driving said telescoping means rectilinearly reciprocatively to move extensively and retractably through said given distance.

2. A transport apparatus according to claim 1, wherein said load carriage means includes:

base platform means for receiving and supporting from below said load;

a pair of right side rollers and a pair of left side rollers for rollably supporting said base platform means to permit it to be moved rollably along said track assembly; and wherein said track assembly includes:

a pair of spaced apart elongated right side tubular rail members for capturing said pair of right side rollers therebetween;

a pair of spaced apart elongated left side tubular rail members for capturing said left side rollers therebetween; and a plurality of spaced apart cross bar members mounted between said right rail members and said left rail members for helping to secure them rigidly together relative to one another.

3. A transport apparatus according to claim 2, wherein said load carriage means further includes:

seat means mounted on top of said base platform means for receiving the load and for supporting it in a desired plane to substantially limit movement thereon as the load is moved from the ground level position to the upper load destination position; and rail means mounted adjacent to said seat means for helping the load to be retained in said seat means.

4. A transport apparatus according to claim 3 wherein said rail means includes:

a pair of spaced apart rails mounted to said base platform means for helping to facilitate adjustment of the plane of said seat means so that it is retained in said desired plane.

5. A transport apparatus according to claim 4, wherein each one of said spaced apart rails include a base member adapted to be mounted to said base platform means; and a pair of side wall members for defining a seat receiving track to help facilitate supporting the load in said desired plane.

6. A transport apparatus according to claim 5, wherein said seat means includes:

a seat platform for supporting from below the load;

a seat mounted to said seat platform for receiving said load;

side rail means mounted to said seat platform for helping to retain said load within said seat;

front rail receiving means mounted to a front portion of said seat platform for helping to secure said front portion of said seat platform within a front portion of the seat receiving track to help maintain said seat platform in a stationary position relative to said base platform means;

rear rail receiving means mounted to a rear portion of said seat platform for helping to secure said rear portion of said seat platform within a rear portion of the seat receiving track to further help maintain said seat platform in a stationary position relative to said base platform means.

7. A transport apparatus according to claim 6, wherein said front rail receiving means includes a pair of spaced apart bar members each dimensioned to be received within said front portion of the seat receiving track;

each bar member including means defining a front stop receiving hole for helping to facilitate removably securing said seat platform within the seat receiving track.

8. A transport apparatus according to claim 7, wherein said rear rail receiving means includes a frame member mounted to said seat platform and having a sufficient height to help maintain said seat platform in said desired plane when said frame member is mounted within the seat receiving track;

said frame member having spaced apart leg members each dimensioned to be received with said rear portion of the seat receiving track;

each leg member including means defining a rear stop receiving hole for helping to facilitate removably securing said seat platform within the seat receiving track.

9. A transport apparatus according to claim 8, wherein said load carriage means further includes a plurality of pin keys for passing through said rails and said seat means to secure said seat means removably within said rails.

10. A transport apparatus according to claim 9, wherein said front truck means includes:

front support means mounted to a front portion of said track assembly for inclining it upwardly a predetermined distance above said ground level;

and wherein said rear truck means includes rear support means mounted to a rear portion of said track assembly for supporting from below said rear portion of said track assembly.

11. A transport apparatus according to claim 10, further comprising:

elongated strut means pivotally mounted at its opposite ends between said front support means and said track assembly for coupling them together in a spaced apart manner and for helping to maintain said rear support means a substantially equal distance from the front wheels to structurally configure said apparatus for weight carrying purposes.

12. A transport apparatus according to claim 11, wherein said plurality of crossbar members includes:
- a frame receiving cross bar member for helping to facilitate the securing of said frame member to said track assembly; and
- a strut receiving cross bar member for helping to facilitate the securing of said strut means to said track assembly.

13. A transport apparatus according to claim 10, wherein said rear support means includes:
- a base plate mounted between a lower one of said right side rail members and a lower one of said pair of left side rail members for helping to secure said lower right side rail member, and said lower left side rail member rigidly together; and
- caster means for rollably supporting the transport apparatus on the ground.

14. A transport apparatus according to claim 13, wherein said caster means includes:
- right caster means mounted on a right side portion of said base plate; and
- left caster means mounted on a left side portion of said base plate for helping to support a rear portion of said track assembly at a desired height above the ground to help facilitate ease in loading of said load carriage means.

15. A transport apparatus according to claim 14, wherein said right caster means includes:
- a right caster receiving block mounted to a right hand portion of said base plate for providing a right hand mounting surface substantially parallel with the supporting surface; and
- a right caster pivotally mounted to said right caster receiving block for enabling the rear portion of said rear truck means to be moved rollably along said supporting surface.

16. A transport apparatus according to claim 15, wherein said left caster means includes:
- a left caster receiving block mounted to a left hand portion of said base plate for providing a left hand mounting surface substantially parallel with the supporting surface; and
- a left caster pivotally mounted to said left caster receiving block for enabling the rear portion of said rear truck means to be moved rollably along said supporting surface.

17. A transport apparatus according to claim 10, wherein said front tires are pneumatic wheels having a substantially greater diameter than said caster means.

18. A transport apparatus, comprising:
- truck means rollably supported on the ground;
- inclined track means mounted on said truck means for defining a given path of travel from a ground level position slightly above the ground to a desired upper level position substantially above the ground;
- rollable carriage means mounted rollably on said track means for supporting from below a load to be transported between the ground level position and the desired upper level position;
- said rollable carriage means including base platform means for receiving said load and a pair of right side rollers and a pair of left side rollers mounted on an underside of said base platform means for rollably supporting said base platform means to permit it to be moved rollably along said inclined track means;
- said track means including a pair of spaced apart elongated right side tubular rail members for capturing said pair of right side rollers therebetween;
- said track means further including a pair of spaced apart elongated left side tubular rail members for capturing said pair of left side rollers therebetween, each one of said rail members extending upwardly at a desired angle of inclination from said ground level position for a predetermined given distance and terminating at said desired upper level position;
- extendable frame support means mounted between said truck means and a front portion of said track means for inclining said track means upwardly at said desired angle of inclination, said frame support means having an adjustable height for permitting a user to select different desired angles of inclination to permit said load to be transported to said upper level position;
- reciprocative means mounted to said track means for moving reciprocatively rectilinearly along a rectilinear path of travel, said rectilinear path of travel being substantially less than said given path of travel;
- pulley means for providing a mechanical advantage to help cause said carriage means to move along said given path of travel when said reciprocative means is moved along said rectilinear path of travel, said pulley means including fixed pulley means mounted to said track means, movable pulley means mounted to said reciprocative means and a line connected at one of its ends fixedly to an upper end of said track means, extending about said movable pulley means and about said fixed pulley means with its opposite end fixed to said carriage means for providing said mechanical advantage to help facilitate moving the load; and
- motive means coupled to said reciprocative means for causing it to be moved reciprocatively rectilinearly along said rectilinear path of travel to in turn cause said carriage means to be moved along said given path of travel.

19. A transport apparatus according to claim 2, wherein said line has a pair of opposite ends, said line is secured at one of its opposite ends to said truck means, and thence said line extends to said movable pulley means and passes around a lower groove in said movable pulley means, thence it extends to said fixed pulley means and passes around a lower groove in said fixed pulley means, and thence it extends to said movable pulley means and passes around an upper groove in said movable pulley means, and thence it extends to said fixed pulley means and passes around an upper groove in said fixed pulley means and thence it extends to said carriage means and is secured at its other opposite end thereto.

20. A transport apparatus according to claim 19, wherein said pulley means establishes a three to one mechanical advantage so that said carriage means moves about three feet for each foot traveled by said reciprocative means along said rectilinear path of travel.

21. A transport apparatus according to claim 18, wherein said truck means further includes:
- rear support means mounted to a rear portion of said track means for rollably supporting said rear portion on the ground.

22. A transport apparatus according to claim 2, further comprising:
- duty cycle circuit means coupled electrically to said motive means for controlling the operation of said motive means.

23. A transport apparatus according to claim 22, wherein said duty cycle circuit means includes a lift duty cycle to help prevent said motive means from overheating.

24. A transport apparatus according to claim 23, wherein said lift duty cycle is about a sixty percent duty cycle.

25. A transport apparatus according to claim 22, wherein said duty cycle circuit means includes a fall duty cycle to help prevent said carriage means from traveling too fast from the upper level to the ground level.

26. A transport apparatus according to claim 25, wherein said fall duty cycle is about a twenty-five percent duty cycle.

27. A transport apparatus according to claim 22, wherein said duty cycle circuit means includes a forward stop switch signal detection circuit for helping to stop said carriage means before it travels beyond the terminal end of the front portion of said track assembly.

28. A transport apparatus according to claim 27, wherein said duty cycle circuit means further includes a rear stop switch signal detection circuit for helping to stop said carriage means before it travels beyond the terminal end of the rear portion of said track assembly.

29. A transport apparatus according to claim 28, further comprising:

a front stop switch for generating said front stop switch signal when said carriage means is at a predetermined distance from the terminal end of the front portion of said track assembly.

30. A transport apparatus according to claim 29, further comprising:

a rear stop switch for generating said rear stop switch signal when said carriage means is at a predetermined distance from the terminal end of the rear portion of said track assembly.

31. A transport apparatus according to claim 30, wherein said carriage means includes a stop bar for actuating said front and rear stop switches, said stop bar preventing said carriage means from traveling beyond the respective terminal ends of said track assembly in the event that other ones of said stop switches fail.

32. A method for accessing the entranceway of a transportation device, having a body with outwardly extending flotation devices attached thereto, said entranceway being disposed above said flotation devices at a sufficient distance above the ground surface to hinder access thereto, comprising:

using a transport apparatus including truck means rollably supported on the ground, inclined track means mounted on said truck means for defining a given path of travel from a ground level position slightly above the ground to a desired upper level position substantially above the ground, rollable carriage means mounted rollably on said track means for supporting from below a load to be transported between the ground level position and the desired upper level position, said rollable carriage means including base platform means for receiving said load and a pair of right side rollers and a pair of left side rollers mounted on an underside of said base platform means for rollably supporting said base platform means to permit it to be moved rollably along said inclined track means, said track means including a pair of spaced apart elongated right side tubular rail members for capturing said pair of right side rollers therebetween, said track means further including a pair of spaced apart elongated left side tubular rail members for capturing said pair of left side rollers therebetween, each one of said rail members extending upwardly at a desired angle of inclination from said ground level position for a predetermined given distance and terminating at said desired upper level position, extendable frame support means mounted between said truck means and a front portion of said track means for inclining said track means upwardly at said desired angle of inclination, said frame support means having an adjustable height for permitting a user to select different desired angles of inclination to permit said load to be transported to said upper level position, reciprocative means mounted to said track means for moving reciprocatively rectilinearly along a rectilinear path of travel, said rectilinear path of travel being substantially less than said given path of travel, pulley means for providing a mechanical advantage to help cause said carriage means to move along said given path of travel when said reciprocative means is moved along said rectilinear path of travel, said pulley means including fixed pulley means mounted to said track means, movable pulley means mounted to said reciprocative means and a line connected at one of its ends fixedly to an upper end of said track means, extending about said movable pulley means and about said fixed pulley means with its opposite end fixed to said carriage means for providing said mechanical advantage to help facilitate moving the load, and motive means coupled to said reciprocative means for causing it to be moved reciprocatively rectilinearly along said rectilinear path of travel to in turn cause said carriage means to be moved along said given path of travel;

adjusting the angle of inclination of said track assembly to accommodate the destination load level of said transportation device;

positioning the transport apparatus adjacent to the entranceway of the transportation device;

connecting said motive means to a source of direct current power supplied by the transportation device;

placing a load on said carriage means;

actuating said motive means to cause said carriage means to travel along said predetermined path of travel to a load access position adjacent to the entranceway of the transportation device; and moving said load off of said carriage means onto the transportation device.

33. A transport apparatus, comprising:

front truck means having an elongated axle with a pair of widely spaced apart front tires disposed on opposite ends thereof for helping the apparatus to be dynamically and statically stable for load transportation purposes;

each one of said tires having a given diameter for supporting said axle at about a height H above the ground;

rear truck means having a pair of closely spaced apart caster means mounted thereon for further helping the apparatus to be dynamically and statically stable for load transportation purposes;

an elongated track assembly mounted at one of its ends on said rear truck means for defining a predetermined path of travel between the ground and an upper load destination position;

triangular frame means mounted between said axle and at the other one of the ends of said track assembly for supporting from below said track assembly, and for causing a front portion of said track assembly to be inclined upwardly at an angle of inclination of about θ degrees relative to the ground;

said frame means including extendable arm means for raising and lowering said track assembly and for adjusting said angle of inclination to accommodate destination loading levels of different heights;

each of said caster means having another given diameter to help position a rear portion of said track assembly a sufficient distance above the ground to compensate for the axle being disposed at about a height H above the ground to facilitate receiving a load in a plane that is substantially parallel with the ground;

load carriage means mounted rollably on said track assembly for supporting a load to be transported between the ground and the upper load destination position to move the load reciprocatively rectilinearly along said path of travel defined by said track assembly;

a pulley apparatus mounted at one end of said track assembly for helping cause said carriage means to move along said path of travel to raise and lower the load;

said pulley apparatus including block means fixedly mounted to said track assembly, a line fixed at one of its ends to said track assembly and extending over said block means with its opposite end fixed to said carriage means, and tackle means connected to said line for providing a mechanical advantage to help facilitate moving the load;

telescoping means mounted at an opposite end of said track assembly and to said tackle means for causing said telescoping means to be moved toward and away from said opposite end through a given distance substantially less than the length of said path of travel and for causing said carriage means to be moved between the ground and the upper load destination position along the entire length of said path of travel;

motive means mounted at said opposite end of said track assembly for driving said telescoping means rectilinearly reciprocatively to move extensively and retractably through said given distance;

wherein said load carriage means includes:
base platform means for receiving said load;
a pair of right side rollers and a pair of left side rollers for rollably supporting said platform means to permit it to be moved rollably along said track assembly;

wherein said track assembly includes:
a pair of spaced apart elongated right side tubular rail members for capturing said pair of right side rollers therebetween;
a pair of spaced apart elongated left side tubular rail members for capturing said left side rollers therebetween;

a plurality of spaced apart cross bar members mounted between said right rail members and said left rail members for helping to secure them rigidly together relative to one another;

wherein said base platform means further includes:
seat means mounted relative to said base platform means for receiving the load and for supporting it in a desired plane to substantially limit movement thereon as the load is moved from a ground level position to a desired upper level position; and
rail means mounted adjacent to said seat means for helping the load to be retained in said seat means.

34. A transport apparatus according to claim 33, further comprising:

engagement means mounted at a front portion of said track assembly for helping to support from below said front portion of the track assembly on the floor of a vehicle to be accessed; wherein said vehicle to be accessed includes a body, an entranceway substantially above the ground and a floor for receiving the load thereon.

35. A transport apparatus according to claim 34, wherein said engagement means includes:

an L shaped floor plate for engaging the body and floor at the entranceway of the vehicle to be accessed;

said floor plate having a floor base plate for overlying a portion of the floor at the entranceway and a rear stop plate for engaging the body of the vehicle to be accessed to help stabilize and support the apparatus on the transport apparatus to be accessed;

a pair of support blocks mounted at a front portion of said track assembly for supporting from above said floor plate so that it can swing pivotally into engaging alignment with the body and floor of the vehicle to be accessed; and pivot means disposed between said pair of support blocks and said floor plate to permit said floor plate to swing pivotally relative to said support blocks.

36. A transport apparatus according to claim 34, further comprising strap means removably attached to said front truck means for securing said front truck means to the vehicle to be accessed.

* * * * *

UNITED STATES PATENT AND TRADEMARK OFFICE
CERTIFICATE OF CORRECTION

PATENT NO.   : 5,489,181
DATED        : February 6, 1996
INVENTOR(S)  : Warren A. Greaves It is certified that error appears in the above-indentified patent and that said Letters Patent is hereby corrected as shown below:

ON THE TITLE PAGE:

Item 57, line 4, after "including", delete "a".

Column 12, line 32, delete "within-the", and substitute therefor --within the--.

Column 14, line 37, delete "2", and substitute therefor --18--.

Column 14, line 60, delete "2", and substitute therefor --18--.

Signed and Sealed this

Tenth Day of June, 1997

Attest:

BRUCE LEHMAN

Attesting Officer

Commissioner of Patents and Trademarks